United States Patent [19]

Bichler et al.

[11] Patent Number: 5,116,251

[45] Date of Patent: May 26, 1992

[54] INLET SYSTEM FOR SUPERSONIC OR HYPERSONIC AIRCRAFT

[75] Inventors: Bartholomäus Bichler, Raubling; Michael Jost, Munich, both of Fed. Rep. of Germany

[73] Assignee: Messerschmitt-Bolkow-Blohn GmbH, Ottobrunn, Fed. Rep. of Germany

[21] Appl. No.: 671,121

[22] Filed: Mar. 18, 1991

[30] Foreign Application Priority Data

Mar. 20, 1990 [DE] Fed. Rep. of Germany ....... 4008956

[51] Int. Cl.⁵ .................................................. B64D 33/02
[52] U.S. Cl. .................................. 244/53 B; 137/15.1; 60/270.1
[58] Field of Search ............. 244/537, 53 B, 74, 55; 60/270.1, 263, 244, 224, 225; 137/15.1, 15.2

[56] References Cited

U.S. PATENT DOCUMENTS

| 3,161,379 | 12/1964 | Lane | 60/270.1 |
| 3,295,555 | 1/1967 | James et al. | 44/53 B |
| 3,324,660 | 6/1967 | Lane et al. | 60/270.1 |
| 3,358,457 | 12/1967 | Caldwell et al. | 60/270.1 |
| 3,589,379 | 6/1971 | Danes et al. | 137/15.1 |
| 4,121,606 | 10/1978 | Holland et al. | 244/53 B |
| 4,919,364 | 4/1990 | John et al. | 244/53 B |

Primary Examiner—Galen Barefoot
Attorney, Agent, or Firm—Toren, McGeady

[57] ABSTRACT

An inlet system, which can be used for all supersonic or hypersonic engine inlets, comprises two or several separate parallel ducts which must be switched over in specific phases of flight. This is accomplished with a duct shaped parallel inlet element pivotably assigned to the inlet ramp of the inlet, which as a channel-connecting re-direction member alternately can close off the turbojet inlet duct as well as also the ramjet inlet. Preferably, the construction comprises a plurality of pivotably connected box-like elements interconnected in a movable manner.

13 Claims, 4 Drawing Sheets

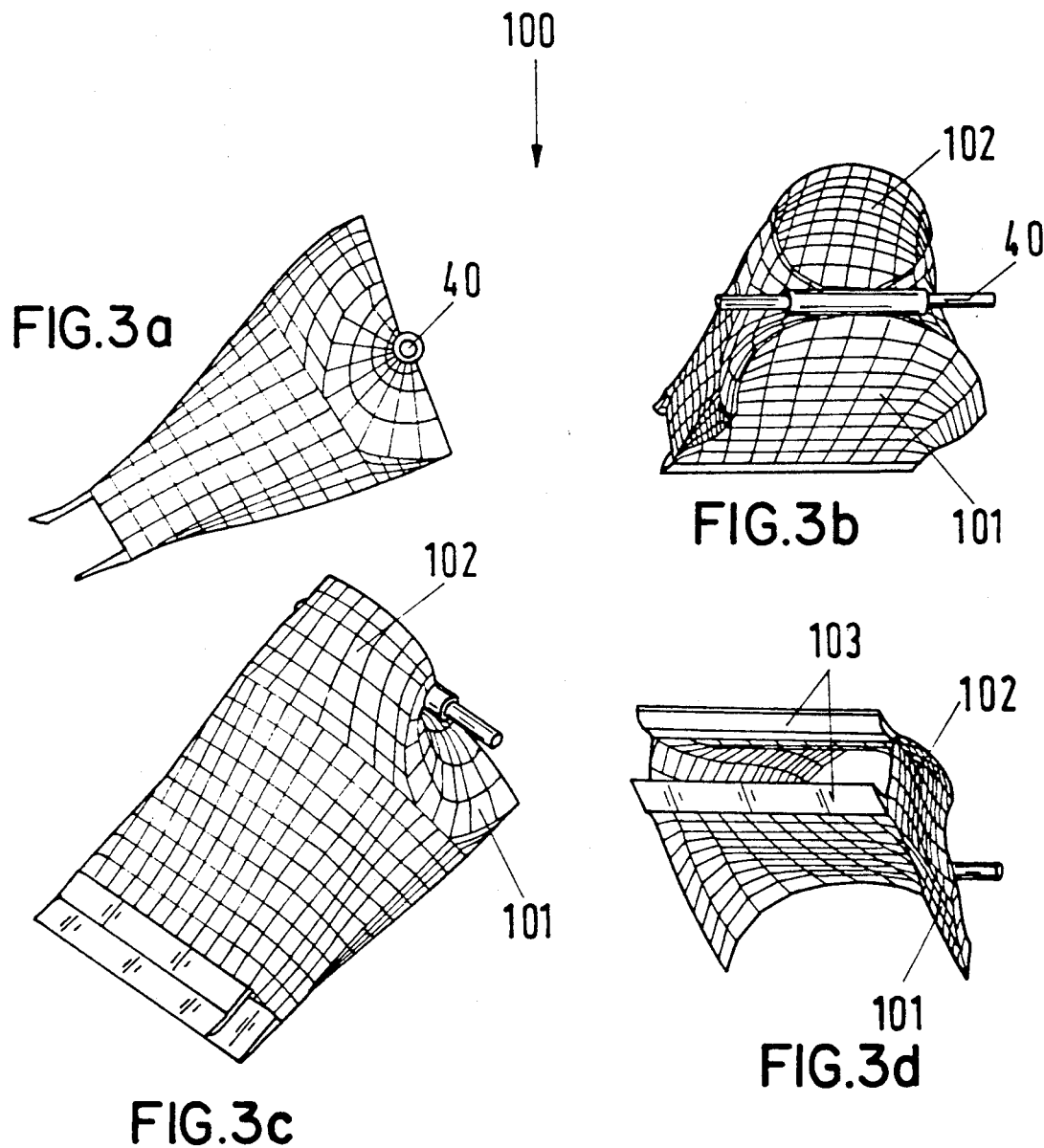

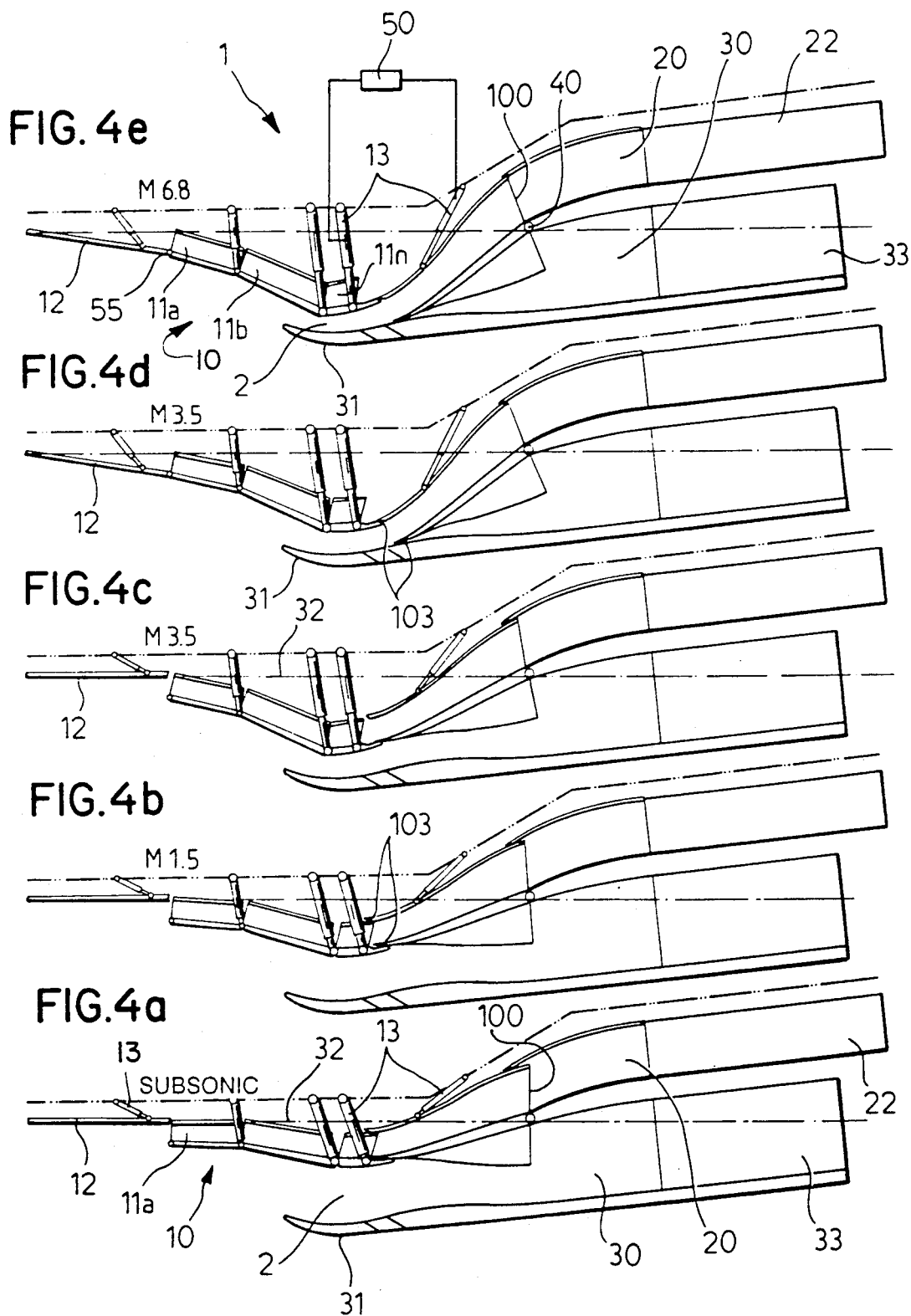

INLET SYSTEM FOR SUPERSONIC OR HYPERSONIC AIRCRAFT

The invention is directed to an inlet system for supersonic or hypersonic aircraft and in particular to an inlet system for a turbojet and ramjet engine.

BACKGROUND OF THE INVENTION

Inlet systems for supersonic aircraft are known in various versions, as for instance from the U.S. Pat. Nos. 3,717,163 and 4,418,879, whose contents are incorporated by reference. In all of these known designs that are dealing with turbojet and ramjet inlets, air for engine operation is supplied over a ramp plate or through a ramp box. These embodiments are, however, unsuitable for an intake system with a turbojet inlet and a ramjet inlet arranged parallel or alongside one another. In the known design, neither control of a differentiated air supply to the respective inlet with a simultaneous control of the entire air supply to the common air intake region, nor a boundary layer bleed off, is possible.

In addition, the intake systems proposed by the known designs cannot be used in the hypersonic range of 4.5 mach to 6.8 mach because of the high occurring pressure stresses and temperature. The highest intake ramp stresses occur in the region of the throat cross-section and the pressure downstream of the throat cross-section rises from approximately 4 bar up to 5.5 bar. This means that the intake system must meet very high structural requirements.

SUMMARY OF THE INVENTION

The present invention has as a major object an intake system of the previously cited type, which permits the switch over of the inlets in a manner optimized aerodynamically, space-wise and weight-wise, in a simple manner, into the desired operational mode of turbojet operation and/or ramjet operation.

Another object of the invention is, at the same time, to control the overall inlet pressure as well as the bleed off of the boundary layer air, with an intake system that is sufficiently stiff to resist bending and torsion, as well as being temperature resistant.

In accordance with one aspect of the invention, the inlet system comprises a pivotable inlet ramp having a box-shaped configuration. Preferably, it comprises a plurality of hollow box-like elements which are relatively pivotable. Further, a pivotably mounted channel-connecting re-direction member is provided for regulating or controlling the respective air supply to the turbojet and ramjet air inlets.

In accordance with other aspects of the invention, the box-like elements are strenghtened by the incorporation of stiffening struts. In addition, the open ends of these elements can be configured with complementary interconnecting means.

The advantages of the invention are especially realized by a construction in which the inlet ramp can always form a favorable flow inlet contour up to the throat cross-section, meaning up to the area of the narrowest point of the intake, by means of the mobile individual segments formed by the box-like and other elements of the system. Moreover, the opening width of the intake can be accurately controllable as a function of flight speed. This prevents the so-called pumping or humming which is detrimental for engine operation.

The box-shaped construction of the inlet ramp constitutes a structure extremely stiff in bending and torsion against the very high stresses occurring at high supersonic and hypersonic speeds, which structure being dimensionally stable maintains the required precision of contours and shapes.

At the same time, the box-type of construction of the inlet ramp permits ready evacuation of the energy rich boundary layer air forming at the aircraft fuselage upstream of the intake through the ramjet inlet into the ramjet engine in a manner having many advantages, among which are the boundary layer air quantity which is to be evacuated is controllable by means of an inlet plate arranged to be pivotable at the inlet ramp.

Furthermore, the re-direction member when arranged in the intake system between the turbojet inlet and the ramjet inlet constituting a re-direction tube or channel is of great advantage, since its pivoting is as a rule controllable synchronously with the inlet ramp, but also solely by itself for air supply to the appropriate air inlet. However, it is also uncontrollable simultaneously to both, meaning it can shut off one or both inlets. The inside contour of the re-direction member can be accurately adapted in a form fitting manner to the respective inside contour of the turbojet or ramjet inlet so as to prevent flow losses.

Given the high temperature and pressure loads, which amount up to 1800° and 5.5 bar in ramjet operation, the geometry of the re-direction member can be optimized in such a way that the re-direction element need only carry the differential pressure between the turbojet and ramjet inlet, thus keeping its thermally exposed surface relatively small. The location of the center of rotation at the re-direction member can also be optimized with respect of the switching or actuation forces resulting, for instance, from the flow impulse, whereby the switchover process can occur very rapidly and thus the flow technology-wise with a high safety factor is assured.

In addition, the inlet plate, the inlet ramp and the re-direction member can be easily controlled or regulated by means of a control or regulation unit together or individually.

The entire intake system can furthermore be designed to be geometrically simple in such a way that it can be fabricated, for instance, from all high temperature resistant metallic or powder metallurgy materials, as well as from fiber-reinforced, carbon composite, or ceramic-materials.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

In the drawings:

FIGS. 3a–3d is one form of re-direction member for use in the embodiment of FIG. 1 in perspective views from different angles;

FIGS. 4a–4e are diagrammatic illustrations of the intake system of the invention in side view, with the position of the inlet ramp and the re-direction member shown at various mach numbers.

DETAILED DESCRIPTION OF THE PREFERRED EMBODIMENTS

Figure 1:
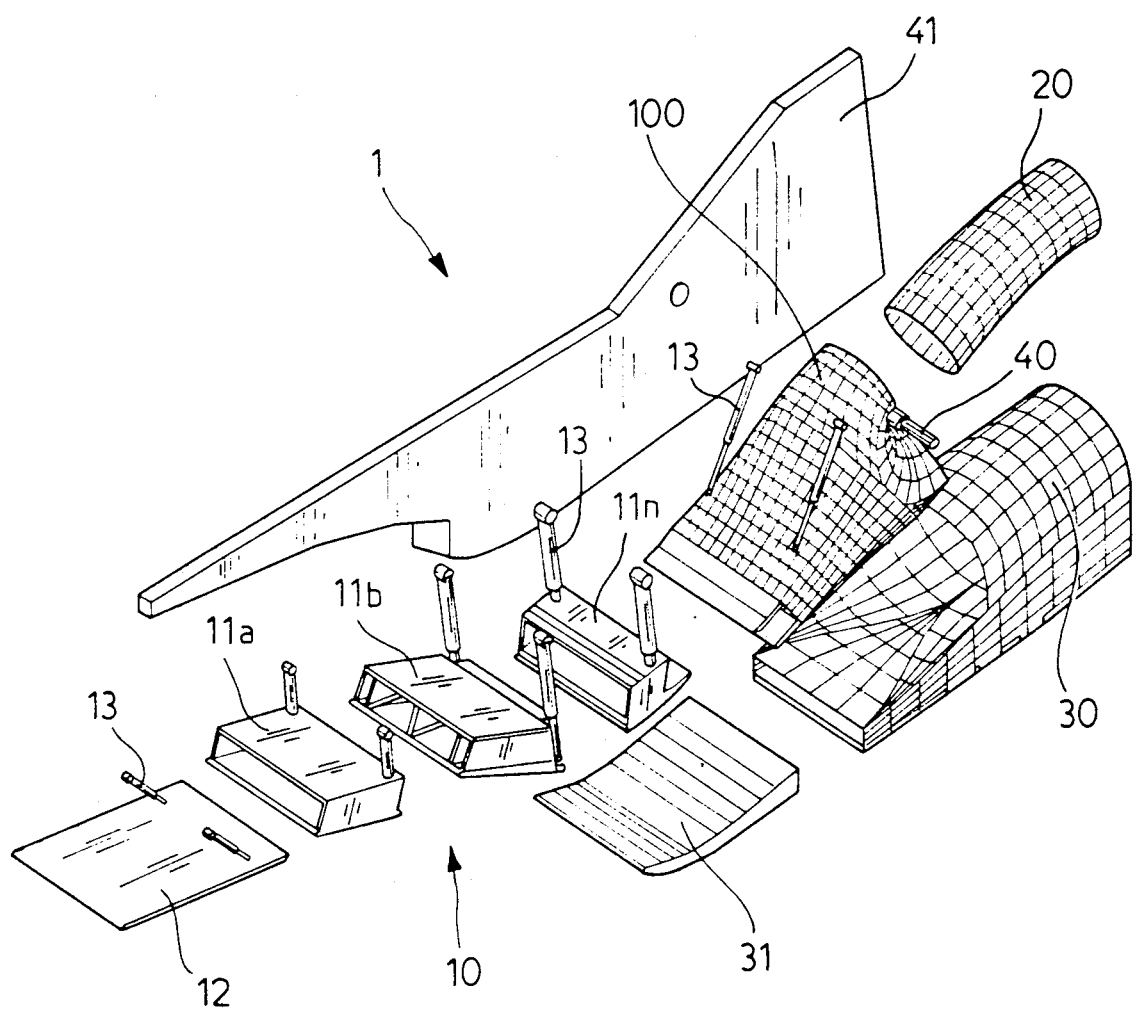
FIG. 1 is an exploded view of the components of one form of intake system according to the invention.

FIG. 1 shows an exploded view of one form of the entire intake system 1 according to the invention, having an inlet ramp for a turbojet inlet 30 provided with an inlet lip 31. A ramjet inlet 20 extends substantially parallel thereto. A re-direction member is designated by the numeral 100. The re-direction member 100 is pivotally supported in the aircraft structure 41, shown here as an intermediate wall between additional inlets.

The re-direction element 100 is designed geometrically in such a way that, with it, because of its vertical pivoting, the intake air can either be directed into the lower turbojet inlet 30 or into the upper ramjet inlet 20 or into both simultaneously, as will be explained in more detail below.

For the rest, the superimposed arrangement of the inlets serves only as an example here, since the inlets in actual fact can extend also next to each other in different planes with respect to each other and actually should not extend strictly parallel to each other, unless in that case the re-direction element 100 and the inlet ramp 10 are also made pivotable in the appropriate direction.

The inlet ramp 10, which is mounted to be vertically pivotable in this example, is comprised of one or several hollow box-like elements supported to be mutually mobile, i.e., movable with respect to one another, of which in this embodiment example three elements are shown designated 11a, 11b and 11n. An inlet plate 12 is mounted and assigned to the most forward hollow box element 11a, which is pivotable by means of hydraulic or other known actuation elements 13 for control of the bleed off quantity of the boundary air, as will be additionally described later.

Figure 2A:
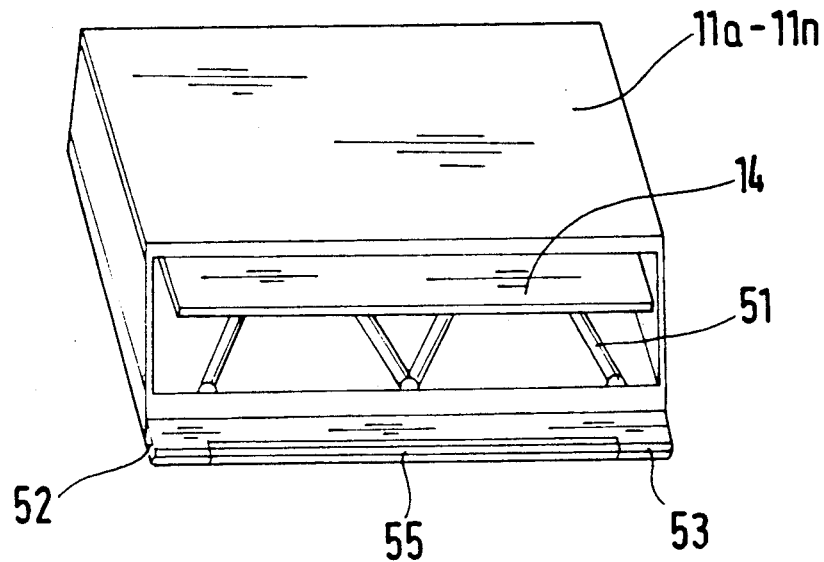
FIG. 2a is a perspective view of one form of hollow box element with spring band steel element for the inlet ramp for use in the embodiment of FIG. 1.

The box shaped construction, which possibly can also have a round shape, for a typical hollow box element 11a to 11n of the inlet ramp 10 can be seen in FIG. 2a, and which preferably comprises stiffening struts 51 or tension elements on its inside having only a small resistance against air flow. The hollow box elements 11a to 11n are in addition provided each at its upper edge with a spring band steel element 14 which engages into the adjacent neighboring hollow box element 11a to 11n, in order to thus cover any gaps generated in the course of the mutual pivoting of the hollow box elements. Furthermore, the hollow box elements 11a–11n can be equipped at their lower surface edge 52, for instance, with a groove 53 for mutual interconnection, and the hollow box element 11a–11n in FIG. 2b can be provided with a complementary tongue 54 for engagement into the groove 53. It is also possible to provide an articulated or swivel bearing or hinge 55 at the hollow box elements 11a–11n instead of a groove tongue connection.

Figure 2B:
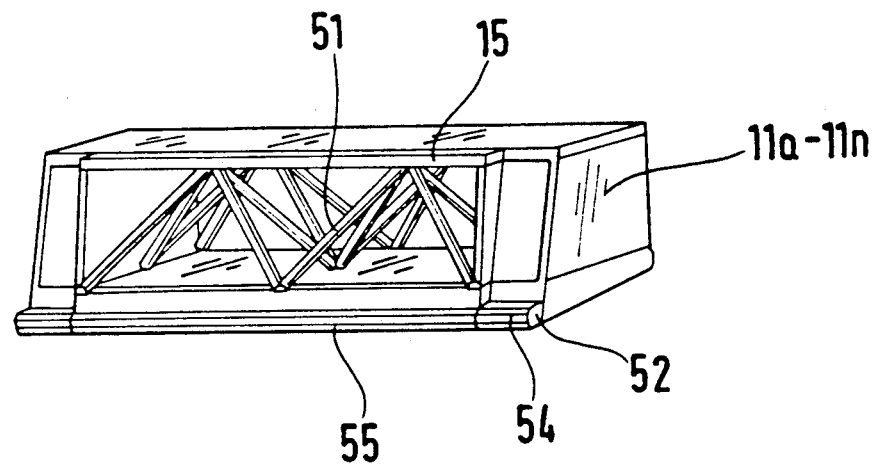
FIG. 2b is a perspective view of one form of hollow box element with spring band steel frame for use in the embodiment of FIG. 1.

The hollow box element in FIG. 2b differs from that shown in FIG. 2a only in that a spring band steel frame 15 is shown there, which engages the open end of an adjacent hollow box element for purposes of covering any gaps between adjacent boxes. In addition to the top covering, it can also be provided to cover side gaps in an advantageous manner.

FIGS. 3a–3d show for better understanding different views of the pivotable re-direction member 100, which can also be described as a switch-over tube, wherein its lower segment 101 is exactly adapted to the inside contour of the turbojet inlet 30 and forms its upper shell. The corresponding upper segment 102 is duct shaped and corresponds exactly to the ramjet inlet 20. In addition, a central joint 40 is arranged at the re-direction element 100, by means of which the re-direction element 100 can be pivotably supported on the aircraft structure 41. In addition, the re-direction element 100 comprises displaceable or mobile sealing lips 103 at its front side, which automatically cover any gaps arising in the course of the re-direction movements to the inlets 20, 30 and to the hollow box element 11n of the inlet ramp 10. In the completely pivoted state, the hollow box element 11n is exactly matchable to the shape of the inlet lip 31 as far as its contour is concerned.

FIGS. 4a–4e show the individual positions of the inlet ramp 10, of the inlet plate 12, and of the re-direction element 100 at different mach numbers from subsonic to mach 6.8.

For operation in the subsonic range according to FIG. 4a, the inlet ramp 10 and the re-direction element 100 are pivoted upwards by means of the hydraulic actuation elements 13 or other known actuation means, whereby the throat cross-section 2 of the turbojet inlet 30 is opened wide in the region of the inlet lip 31 for operation of the turbojet engine 33. Because of the upper position of the re-direction member 100, the ramjet inlet 20 is closed-off with respect to the throat cross-section 2. However, the access to the ramjet inlet 20 through the box shaped inlet ramp 10 is free for bleed-off of the boundary layer air formed in front of said inlet ramp at the external contour 32 of the otherwise not-shown aircraft. For this purpose the inlet plate 12 arranged at or near the hollow box element 11a is pulled by means of the actuation element 13 upwards against the aircraft contour 32.

FIG. 4b shows the inlet ramp 10 slightly pivoted downwards for operation in the mach 1.5 range, in order to narrow the throat cross-section, wherein the re-direction member 100 for turbojet operation as well as the inlet plate 12 for the boundary air bleed-off through the ramjet inlet 20 continues to be in the upper position as before.

In addition, the sealing lips 103, which are in contact with the inlet ramp 10 can be seen here, of which then the bottom one covers a gap in the lower position, meaning near the inlet lip 31, as can be seen in FIG. 4d.

The two FIGS. 4c and 4d show the two possible operational modes with a turbojet operation on the one hand and the ramjet operation on the other hand in the mach 3.5 range with the greatly narrowed throat cross-section 2.

During turbojet operation according to FIG. 4c, inlet ramp 10 is pivoted even further downwards for additional throat cross-section constriction (compared to FIG. 4b), wherein the re-direction member 100 is indeed also pivoted with it, however, remains still completely aligned with the inlet ramp 10 and thus continues to enable a boundary layer bleed off.

In FIG. 4d, pure ramjet operation is shown, meaning for this purpose the re-direction member 100 is completely pivoted downwards with the position of the inlet ramp remaining the same and the turbojet inlet 30 is thereby closed, wherefore the inlet flow is now exclusively directed to the ramjet inlet 20. Then, the access of the boundary layer air to the inlet ramp 10 can be blocked by means of the downwards pivoted inlet plate 12. This is continued in FIG. 4e with the continued greatly narrowed throat cross-section 2 of the inlet for ramjet operation at hypersonic speed of, for instance, mach 6.8.

It is also conceivable with a ramp position as shown in FIGS. 4c and 4d that then, in a manner not shown here, simultaneous operation of the turbojet engine 33 and of the ramjet engine 22 is possible through their inlets 30, 20, with, for instance, the re-direction member 100 being then pivoted downwards only through half of its excursion, which then is only aligned at half its height with the inlet ramp 10. Then still only a portion or the entire boundary layer air could be bled-off or evacuated through the ramjet inlet 20.

The inlet ramp 10, the inlet plate 12 and the re-direction element 100 can be controlled or regulated by means of hydraulic or other actuating elements 13, such as cylinders or spindles through one or several known control or regulation units 50 together in common, relatively to each other, or individually. The common control or regulation of all pivotable components 10, 12, 100 is especially useful for the range up to the lower supersonic speeds, while beginning with the higher supersonic speed range an individual control or regulation would be more advantageous.

The entire intake system, including the pivotable components, can be readily manufactured from metallic or powder metallurgy materials as well as from fiber-reinforced, carbon composite or ceramic composite materials which are resistant to high temperature.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. An inlet system for supersonic and hypersonic aircraft for supplying air to substantially parallel turbojet and ramjet engine inlets, comprising a pivotable inlet ramp having a box shaped configuration for changing the inlet cross-section, said inlet ramp comprising a plurality of hollow box-like elements bounded by walls on all sides, means for pivotably supporting said box-like elements with respect to each other, a pivotable inlet plate upstream of the box-like elements, and a pivotably arranged re-direction member connected with the inlet ramp downstream of the box-like elements for regulating the air supply to the turbojet and ramjet inlets.

2. An inlet system according to claim 1, characterized in that the hollow box elements are configured at their lower surface edges on one open side as a groove and on the other open side as a tongue for engaging respectively with a tongue and groove of an adjacent hollow box element.

3. An inlet system according to claim 1, characterized in that means are provided for movably connecting adjacent hollow box elements.

4. An inlet system according to claim 3, characterized in that the movably connecting means comprise an articulated bearing.

5. An inlet system according to claim 1, characterized in that the hollow box elements comprise on their interior, stiffening struts.

6. An inlet system according to claim 1, characterized in that at least one of the hollow box elements comprises a spring band steel element fastened at least at its upper edges.

7. An inlet system according to claim 1, characterized in that at least one of the hollow box elements comprises a spring band frame which is introducible into and engages the hollow space of the adjacent hollow box element or into the ramjet inlet.

8. An inlet system according to claim 1, characterized in that displacement elements are provided for positioning the re-direction member synchronously with the inlet ramp and its inlet plate into different mach number positions, and a control or regulation unit common for all displacement elements.

9. An inlet system according to claim 1, characterized in that displacement elements are provided for positioning the re-direction member with the inlet ramp and its inlet plate into different mach number positions, and one or more control or regulation units are provided for said displacement elements.

10. An inlet system according to claim 1, characterized in that the inlet ramp and the re-direction member together with all individual elements are made from metallic or powder metallurgy materials, or from fiber-reinforced, carbon or ceramic composite materials, resistant to high temperatures.

11. An air inlet system for super or hypersonic aircraft for the air supply to turbo jet and ramjet inlets arranged substantially parallel to each other, said inlet system comprising an inlet ramp comprising plural assembled mobile elements forming a pivotable inlet ramp (10) for changing the inlet cross-section (2), said mobile elements comprising plural pivotable hollow box elements (11a, 11b . . . 11n) supported to be mobile with respect to each other for supplying inlet and boundary layer air, a re-direction element (100) mounted downstream for receiving the inlet and boundary layer air, and a central joint (40) supported in the aircraft structure (41) between the turbojet inlet (30) and the ram jet inlet (20), said re-direction element (100) being pivotable on said central joint (40) towards the turbojet and ramjet inlets (30, 20), said re-direction element (100) comprising a lower segment (101) configured to fit to the turbojet inlet (30) in a positively locking manner and a channel segment (102) corresponding to the shape of the ramjet inlet (20).

12. The system of claim 11, wherein said lower segment (101) and said channel segment (102) are integral forming one piece.

13. An inlet system according to claim 11, characterized in that the re-direction member comprises sealing lips arranged to be displaceable and facing the inlet ramp.

* * * * *